United States Patent [19]

Dimesky et al.

[11] Patent Number: 5,565,108
[45] Date of Patent: Oct. 15, 1996

[54] SYSTEM FOR THE CONTROL AND RETARDATION OF THE GROWTH OF ALGAE

[76] Inventors: Robert S. Dimesky, 4 Drumlin Rd., West Simsbury, Conn. 06092; Francis X. Hursey, 27 Keeney Ave., West Hartford, Conn. 06107

[21] Appl. No.: 288,445

[22] Filed: Aug. 10, 1994

Related U.S. Application Data

[63] Continuation-in-part of Ser. No. 143,656, Nov. 1, 1993.
[51] Int. Cl.⁶ .................................................. B01D 19/00
[52] U.S. Cl. ........................... 210/750; 210/764; 95/263; 95/265
[58] Field of Search ............................... 210/750, 764; 95/265, 263

[56] References Cited

U.S. PATENT DOCUMENTS

| | | | |
|---|---|---|---|
| 1,725,925 | 8/1929 | Kent | 210/750 |
| 1,762,784 | 6/1930 | Kriegsheim | 210/750 |
| 2,299,553 | 10/1942 | McKinnis | 99/155 |
| 2,734,028 | 2/1956 | Domogalla | 210/23 |
| 3,142,615 | 7/1964 | Wehner | 167/22 |
| 3,247,054 | 4/1966 | Hodge | 167/22 |
| 3,251,357 | 5/1966 | Williamson | 126/355 |
| 3,258,422 | 6/1966 | Ferry | 210/64 |
| 3,366,441 | 1/1968 | Ellner et al. | 21/74 |
| 4,092,943 | 6/1978 | Lund et al. | 114/222 |
| 4,260,398 | 4/1981 | Ransohoff | 55/41 |
| 4,658,757 | 4/1987 | Cook | 119/3 |
| 4,752,401 | 6/1988 | Bodenstein | 210/746 |
| 4,872,986 | 10/1989 | Stringfellow et al. | 210/611 |
| 5,015,394 | 5/1991 | McEllhenney et al. | 210/744 |

*Primary Examiner*—Neil McCarthy
*Attorney, Agent, or Firm*—Chilton, Alix & Van Kirk

[57] ABSTRACT

A method of retarding the growth of algae in aqueous solution is disclosed. An aqueous medium is moved along a flow path in a direction terminating at an aqueous solution into which the aqueous medium is added. Before adding said aqueous medium into the aqueous solution, a gas stream having a nitrogen content in excess of 90% is injected into the aqueous solution in the same direction in which the aqueous solution is moved along the flow path. The gas stream is injected into the aqueous medium at a flow rate of at least 0.01 cubic feet per hour and said gas stream and said aqueous medium continue to intermix along said flow path prior to reaching the termination of the flow path at the aqueous solution.

7 Claims, 2 Drawing Sheets

5,565,108

SYSTEM FOR THE CONTROL AND RETARDATION OF THE GROWTH OF ALGAE

RELATED APPLLICATION

This application is a continuation-in-part of co-pending U.S. application Ser. No. 143,656, filed Nov. 1, 1993.

FIELD OF THE INVENTION

The present invention relates generally to the control and retardation of the growth of algae and the like and is more particularly concerned with a new and improved process and apparatus for effecting such control and retardation.

DESCRIPTION OF THE PRIOR ART

Numerous and various techniques have been employed heretofore for the control of algal growth in standing water systems. Some of these have involved the use of chemical treatments, such as the use of alkanolamine and an inorganic copper salt as taught in U.S. Pat. No. 2,734,028, acid salts of dodecylguanidine as taught in U.S. Pat. No. 3,142,615, and pseudomonas species as taught in U.S. Pat. No. 4,872,986. Others have suggested the provision of shading or light elimination as in U.S. Pat. No. 3,258,422 or the employment of ultraviolet and/or ozone producing radiation as disclosed in U.S. Pat. No. 3,366,441 and U.S. Pat. No. 4,752,401 or simply gas diffusers connected to an ozone source (see U.S. Pat. No. 4,092,943). Still others have contended that treating the water with carbon monoxide (U.S. Pat. No. 3,251,357) or simply providing a circulating pumping system (U.S. Pat. No. 4,658,757) will provide an efficacious result. Thus, the art appears to be replete with numerous suggestions, many of which appear to be contradictory, for treating or controlling the growth of algae.

Despite the diverse proposed solution, the art appears to be consistent in its indication that the growth of algae has been a persistent problem for various water systems and the description of those problems, as set forth in the above-mentioned patents, is incorporated herein by reference.

Thus, bodies of water where heat and various degrees of light and high nutrient levels are present frequently are polluted by excessive growth of algae and other microorganisms. The pollutants tend to impart a distasteful appearance and odor to the water and generally interfere with the proper utilization of such water and processes associated therewith. For example, standing water found in tanks or vats in photo film processing houses are particularly susceptible to the fomation of algae and other microorganisms. Additionally, cooling systems, hospital equipment and x-ray equipment, wastewater treatment plants, swimming pools and other locations where recycled water is held for usage or changed infrequently are susceptible to the buildup of algae, bacteria and the like, if not cleaned on a regular basis. This buildup can be a significant problem and is treated traditionally with anti-algae, antibacterial chemicals. Of course, such chemicals are expensive, frequently are unsafe to handle, and are detrimental to the environment creating additional problems downstream at water treatment plants worldwide. Accordingly, the control and retardation of algae without the use of such chemical treatment would be substantially advantageous.

SUMMARY OF THE INVENTION

Accordingly, the present invention provides a new and improved method and apparatus for controlling and retarding the growth of algae, while obviating the need for harsh and detrimental chemical treatments employed heretofore. A further feature of the present invention is a reduction in the frequency of disposing or discarding aqueous solutions and the cleaning and scrubbing required due to the growth of algae in the aqueous solutions. The system of the present invention is particularly applicable to photo processing solutions which employ a warm, moist, nutrient-rich environment where frequent replacement of the treating solution is necessitated due to the propensity to algae growth.

Another feature of the present invention is the employment of readily available gas streams that can be easily, conveniently and quickly injected or infused under pressure into a flow path of an aqueous solution, such as in the recycling system of a photo film processor, to solve or reduce the problems evidenced heretofore.

Other advantages and objects of the invention will be in part obvious and in part pointed out more in detail hereinafter.

These and related advantages are achieved in accordance with the present invention by providing a method and apparatus for controlling the growth of algae that involves the steps of providing an aqueous solution which, if left untreated, is susceptible to the rapid growth of algae, moving an aqueous medium stream along a flow path in a first direction and controllably injecting into the aqueous medium stream a gas stream having a nitrogen content in excess of 90% and preferably up to 99%. The injection of the high-nitrogen gas stream is preferably in the same direction as the flow stream and takes place while the aqueous medium is moving through an injection station within the flow path. The injection of the high nitrogen content gas stream preferably is effected at a flow rate of at least 0.01 cubic feet per hour, and the mixed gas and aqueous medium stream further intermix along the flow path before being discharged into the aqueous solution being treated.

The invention accordingly consists in the several steps and the relationship of one or more of such steps with respect to each of the others, as well as the apparatus for performing that method, consisting of the features of construction, combination of elements and arrangement of parts, which will be exemplified in the construction hereinafter set forth.

DESCRIPTION OF THE PREFERRED EMBODIMENTS

For simplicity of description and ease of illustration and understanding, the present invention will be described in connection with a photographic film processing system, and particularly with respect to the film processing tanks or vats containing aqueous chemical solutions and used for developing photographic film in a rapid manner. As will be appreciated, the process and apparatus of the present invention may readily be used with other systems employing an aqueous medium and machinery therefor, such as cooling systems, waste water treatment plants, hospital equipment, x-ray equipment, and other processes where recycled water is employed and where such water is susceptible to the rapid buildup of algae, bacteria and related materials requiring cleaning of the containment vessels on a regular basis.

Figure 1:
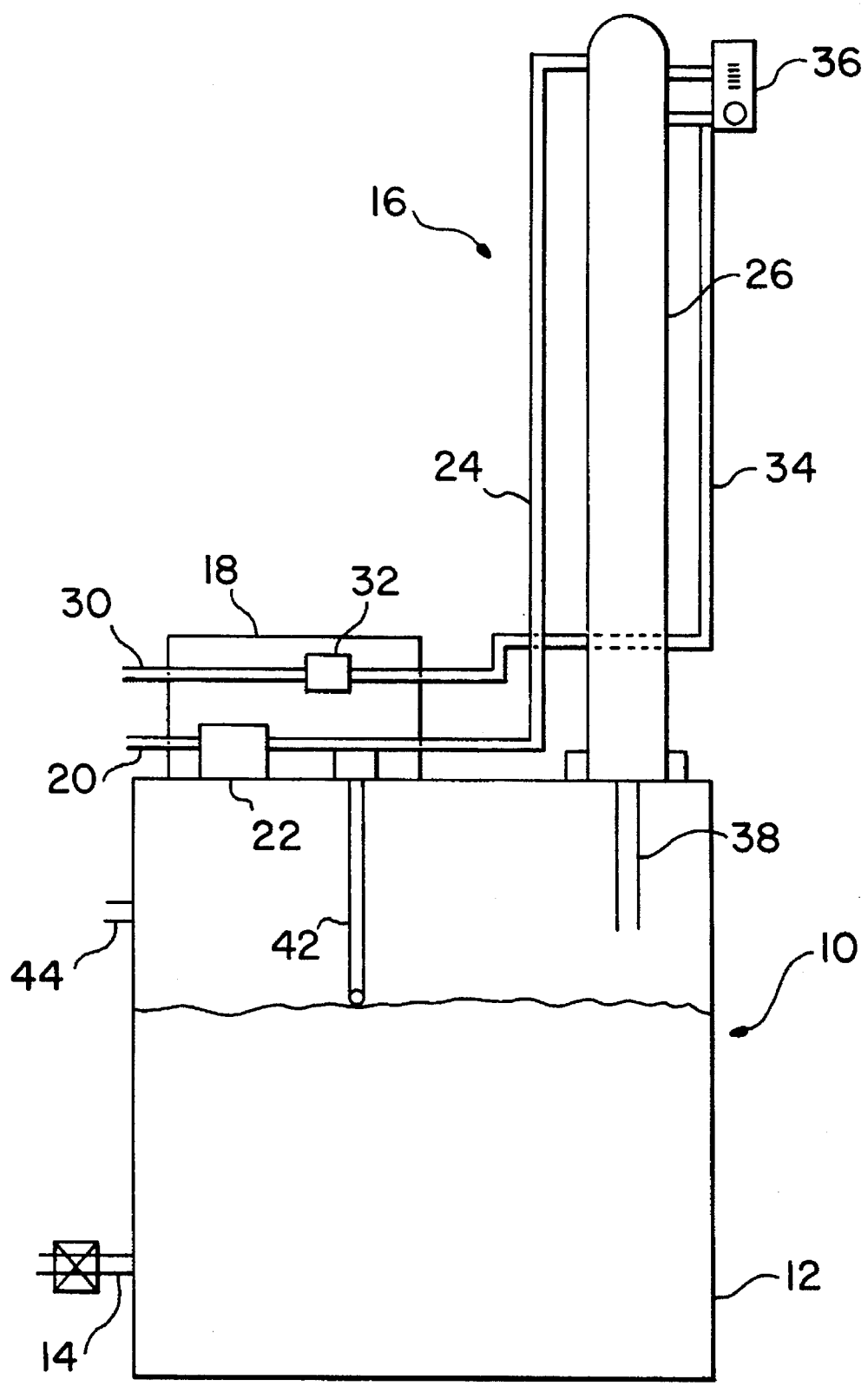
FIG. 1 is a schematic illustration of a first embodiment of a device for infusing a gas stream into an aqueous medium susceptible to the rapid growth of algae.

Referring now to the drawings in greater detail wherein like reference numerals indicate like parts throughout the figures, the aqueous solution treating apparatus is preferably confined to a small unit, generally designated 10, connected to holding tanks for the aqueous solution being treated, such as the photographic film processing tanks used for developing photographic film and the like. As shown in FIG. 1, the water treating apparatus 10 may itself include a small aqueous medium holding tank 12 having its outlet 14 connected to the tank or vat (not shown) of a film processing system. As will be appreciated, the aqueous medium within the holding tank 12 may be initially derived from a pure water source or may result from the recirculation of the aqueous solution through the system.

As shown in FIG. 1, the treating apparatus 10 may include a holding tank or drum 12 that provides a support for the main gas infusion station 16 of the apparatus. The infusion station 16 includes an inlet control module or box 18 for controlling the inlet of both the aqueous media or water and the infusion gas used to treat the water. The control module's water inlet 20 is shown as being controlled by an appropriate solenoid valve 22, movable between its open and closed positions. When in its open position, water will flow through the valve 22 and along a water feed line or tube 24 to the top of a generally cylindrical infusion column 26. The control box 18 also includes a gas inlet port 30 that is similarly controlled by an appropriate valve 32, such as a solenoid actuated valve, that also is movable between an open and closed position for controlling the flow of the gas toward the infusion column 26. The gas flows from the inlet valve 32 through an appropriate conduit 34 and passes a flow meter 36 before proceeding to the top of the infusion column 26. As will be appreciated, the feed gas travels under pressure toward the column, and the flow meter includes a preset flow valve for controlling gas flow to the column. The feed gas enters the top of the column where it is injected into the water stream and travels downwardly through the column where infusion and intermittent mixing of the gas and water occurs. As will be appreciated, the gas preferably flows along substantially the same flow path as the water stream within the infusion column.

In the embodiment of FIG. 1, the column is of sufficient size so that upon infusion of the gas into the water stream, a pressure equalization takes place and the liquid/gas mixture is permitted to equilibrate to atmospheric pressure. The mixture flows downwardly through the column 26 and exits the column via an exit port 38 therein where it flows into the holding drum 12. During initial startup and operation, the water or liquid level within the drum continues to rise until the level reaches a preselected level where a float switch 42 senses the level and electronically signals closure of the solenoid valves 22, 32 within the control box 18 to terminate flow of both water and gas through their respective inlet lines. The holding tank is provided with a valve-controlled exit port 14 adjacent its base through which the gas-infused water passes as it moves to its point of use within the processing system. An overflow drain 44 located above the float switch 42 prevents buildup within the holding tank to a point that would cause an overflow of the tank or interfere with the operation of the infusion apparatus.

The gas stream preferably employed in the infusion system is substantially pure nitrogen gas, although the method of the present invention may also be achieved by using a gaseous mixture containing at least about 90% nitrogen. The preferred nitrogen content of the gas stream is in excess of 95% and typically is about 99% nitrogen.

The flow rate for injecting the infusion gas into the aqueous medium may vary significantly in order to provide the desired result. This, of course, will vary depending on the flow rate of the liquid, but generally is effective at a gas flow rate of at least 0.01 cubic feet per hour. Operation of the system typically takes place at about 0.05 to 0.5 cubic feet per hour, the preferred operating range being about 0.1 to 0.25 cubic feet per hour at an aqueous solution flow rate of about 7 gallons per minute. It will be appreciated that the flow rate of both the nitrogen gas and the aqueous solution will vary depending on the particular system with which the infusor is being used.

The system also may incorporate an internal closed loop recycling arrangement so that when fresh water is employed, the water within the holding tank may be recirculated through the infusion column to assure appropriate levels of infused nitrogen within the aqueous medium prior to conveying the aqueous medium to its point of use. Where pure nitrogen is employed as the injection or infusion gas, less recycling within a closed loop is required to maintain the treating solution at an effective algae retarding level although recycling of the treated solution may be required.

Figure 2:
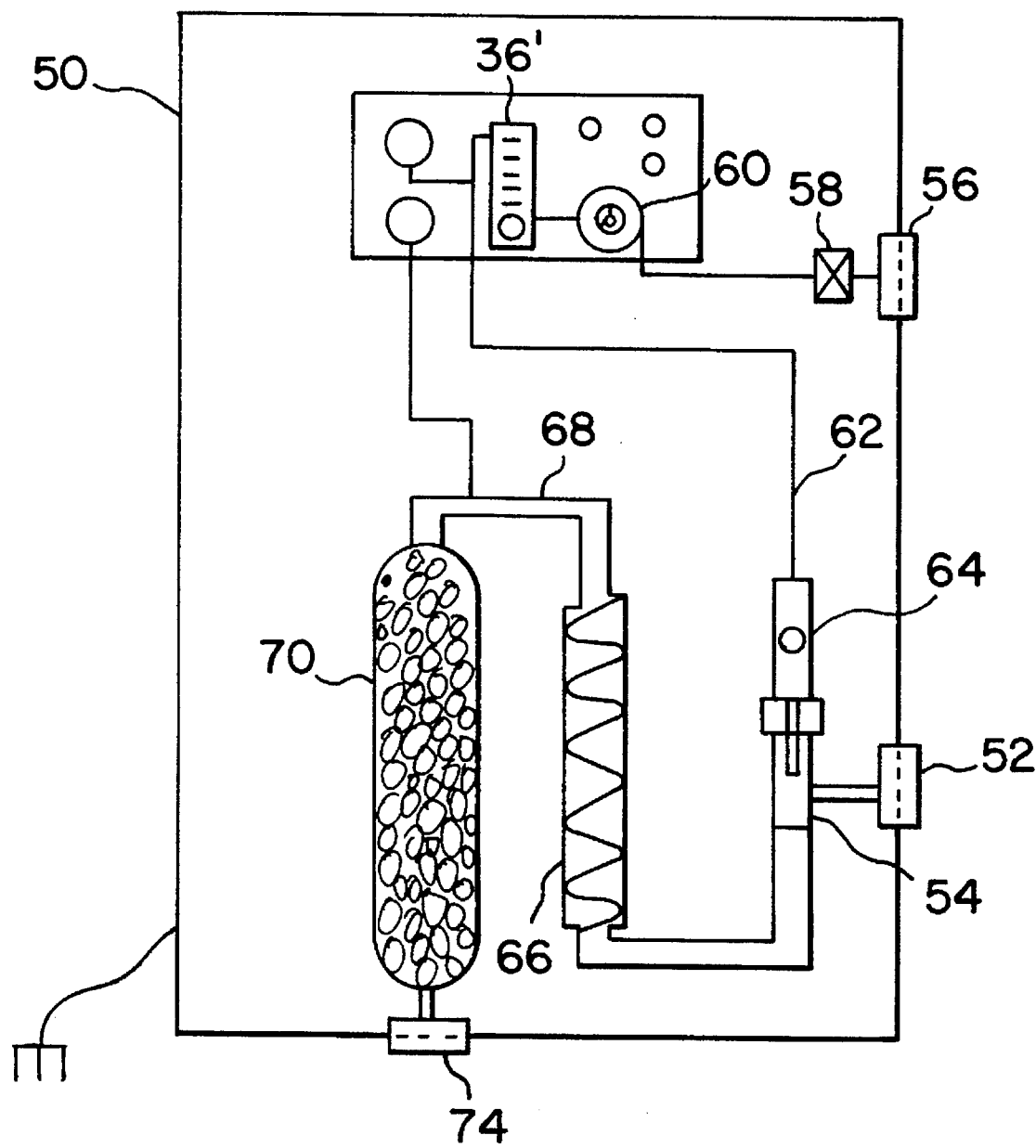
FIG. 2 is a schematic illustration of another embodiment of a gas stream infusion device in accordance with the present invention.

The holding tank associated with FIG. 1 may be eliminated without adversely impacting on the operation of the system. As shown in the embodiment of FIG. 2, the water or aqueous solution being treated enters the infusion apparatus 50 through a valve controlled side inlet 52 directly connected to a T-shaped first stage 54 of a gas diffuser station. The feed gas, in turn, enters the apparatus through its side inlet port 56 appropriately controlled by a solenoid valve 58 and proceeds past a pressure regulator 60 and flow meter 36' before flowing through the gas feed line 62 to the first stage 54 of the diffuser station. A check valve 64 is provided within the gas line 62 to prevent backflow upstream of the diffuser. With the solenoid valve 58 in its open position, nitrogen flows to the diffuser under sufficient pressure to inject the gas into the water stream entering the first stage 54 of the diffuser from the water inlet port 52. The mixture then flows to a second stage static mixer 66 where a serpentine flow path effects further mixing of the water and feed gas. The mixture then passes through conduit 68 to a final infusor column or tank 70 filled with biospheres that provide a tortuous flow path for the mixture where final mixing thereof occurs prior to discharge from the cabinet at an appropriate valve control discharge port 74.

The cabinet 50 may be provided with an appropriate control panel 76 on which is mounted the gas flow regulator 60 and flow meter 36'. The unit is electrically connected to an appropriate power supply and includes a fused power line controlled by an on/off switch 78, also mounted on the panel 76. Pressure indicators 80, 82 for both the feed gas line 62 and conduit 68 also may be provided on the panel for monitoring the operation of the system.

EXAMPLE

The method of the present invention was tested to determine the effect of the gas infusion system on the growth of algae. During this test procedure, two identical test tanks were provided and water flow therethrough was controlled at the identical flow rate. The water in the first tank was untreated while water flowing to the second tank was gas-infused in accordance with the present invention. In both instances, the flow rate of the aqueous medium was at one gallon per minute. The water entering the second tank was infused with 99% nitrogen gas flowing at a rate of 0.1 cubic feet per hour.

Both tanks were observed for a two week period of continuous operation. The untreated tank appeared slightly murky after two weeks, while the tank treated with the nitrogen gas infusion was completely clean. The test continued for a two month period. After that time, the aqueous solution within the first tank was completely green in color with clear signs of algae growth, while the second tank was found to be completely clear.

The system of the present invention also was installed at a photographic film processing location. Before installation of the gas infusion treatment, it was necessary to rinse the processing tanks of the film processor every two weeks and to scrub and clean the tanks in order to avoid buildup of algae growth. However, after installation of the system of the present invention, it has been found that the period between cleaning can be extended to about 8–10 weeks, a 400–500 percent improvement.

As will be apparent to persons skilled in the art, various modifications and adaptations of the structure above described, as well as the method detailed herein, will be readily apparent without departing from the spirit and scope of the invention.

We claim:

1. A method of retarding the growth of algae comprising the steps of providing an aqueous solution which, if left untreated, is susceptible to the growth of algae, moving an aqueous medium along a flow path in a first direction, said flow path terminating at said aqueous solution for adding said medium to said solution, and controllably injecting into the aqueous medium before said medium is added to said solution a gas stream having a nitrogen content in excess of 90%, the injection of the gas stream also flowing in said first direction and being at a flow rate of at least 0.01 cubic feet per hour whereby said gas stream and said aqueous medium continue to intermix along said flow path prior to reaching the termination of the flow path.

2. The method of claim 1 including the step of controlling the flow along the flow path.

3. The method of claim 1 wherein the nitrogen in the gas stream exceeds 95%.

4. The method of claim 1 wherein the mixed gas and aqueous medium flows along a tortuous path to assure intimate intermixing thereof.

5. The method of claim 1 wherein the nitrogen content of the gas is about 99% and the flow rate is about 0.1 cubic feet per hour.

6. The method of claim 1 wherein said aqueous solution is exposed to a nutrient-rich environment and the mixed gas and aqueous medium is added to the aqueous solution in an amount sufficient to retard the growth of algae in the solution exposed to the nutrient-rich environment for a period equal to at least twice the useful life of the same aqueous solution when not treated with the aqueous medium.

7. The method of claim 6 wherein the aqueous solution is exposed to the nutrient-rich environment during photographic film processing.

* * * * *